United States Patent [19]

Geerts

[11] Patent Number: 5,436,212
[45] Date of Patent: Jul. 25, 1995

[54] ORGANOALUMINOXY PRODUCT, PREPARATION, AND USE

[75] Inventor: Rolf L. Geerts, Bartlesville, Okla.

[73] Assignee: Phillips Petroleum Company, Bartlesville, Okla.

[21] Appl. No.: 227,926

[22] Filed: Apr. 15, 1994

[51] Int. Cl.$^6$ ............................ C08F 4/02; C08F 4/62; C08F 4/64

[52] U.S. Cl. ........................... 502/113; 502/103; 502/117; 556/175; 556/179; 556/183; 526/138; 526/142; 526/160

[58] Field of Search .................. 502/103, 113, 117; 556/170, 175, 178, 179, 181, 183

[56] References Cited

U.S. PATENT DOCUMENTS

| | | | |
|---|---|---|---|
| 3,219,591 | 11/1965 | Vandenberg | 252/431 |
| 4,990,640 | 2/1991 | Tsutsuo et al. | 556/181 |
| 5,091,352 | 2/1992 | Kioka et al. | 502/103 |
| 5,093,295 | 3/1992 | Tomotsu et al. | 502/103 |
| 5,308,815 | 5/1994 | Sangokoya | 502/103 |
| 5,329,032 | 7/1994 | Tran et al. | 556/179 |
| 5,354,721 | 10/1994 | Geerts | 502/117 |
| 5,371,260 | 12/1994 | Sangokoya | 556/175 |

FOREIGN PATENT DOCUMENTS

2280/88  3/1989  Australia .

OTHER PUBLICATIONS

"Crystalline Catalysts containing Al—O—Al or Zn—N—An Groups for Sterospecific Polymerization of Propylene Oxide", Hisaya Tani et al., Journal of the American Chemical Society, 89:1, pp. 173-174, Jan. 4, 1967.

"Ethylaluminum Oxide Catalysts form $Et_3AlOi$–$Et_2AlCl$ Binary System in Relation to Species of $AlEt_3$-Water Catalyst", Takeo Araki et al., Journal of Polymer Science, vol. 11, pp. 699-712, 1973.

"Behavior of the $R_2AlOAlR_2$ Catalyst in the Polymerization of Propylene Oxide", Ueyama et al., Macromoecules, vol. 7, No. 2, Mar.-Apr. 1974, pp. 153-160.

"Polymethylaluminum Oxide and Stereoregular Polymerization of Propylene Oxide", Oktem et al., Eur. Polymer J., Vol. 29, No. 5, pp. 637-643, 1993.

*Primary Examiner*—Sharon A. Gibson
*Attorney, Agent, or Firm*—Marianne H. Michel

[57] ABSTRACT

In accordance with the present invention, there is provided a solid organoaluminoxy product prepared by reacting an organoaluminoxane with an oxygen-containing compound selected from the group consisting of organic peroxide, alkylene oxide, or organic carbonate. Further there is provided olefin polymerization catalyst systems comprising the solid organoaluminoxy product and a transition metal-containing catalyst. Still further there is provided processes for the polymerization of olefins using the catalyst systems.

27 Claims, No Drawings

ORGANOALUMINOXY PRODUCT, PREPARATION, AND USE

The present invention relates to solid organoaluminoxy products. The term organoaluminoxy as used herein refers to organic compounds having a plurality of aluminum atoms each bound to at least two oxygen atoms. In another aspect, the present invention relates to a method of modifying organoaluminoxanes to make them suitable for use in particle form polymerization. In still another aspect, the present invention relates to a catalyst system comprising a transition metal-containing catalyst and a solid organoaluminoxy product. In still another aspect, the present invention relates to a process for polymerizing olefins employing such catalyst systems.

BACKGROUND OF THE INVENTION

Organoaluminoxanes are known in the art and can be produced by the partial hydrolysis of hydrocarbyl aluminum compounds. Such aluminoxanes have been found useful in a variety of chemical reactions, including utility as cocatalyst components for polymerization catalysts, especially in high activity metallocene catalyst systems. Such metallocene catalysts have been used in homogeneous solution polymerization. Since such homogeneous catalyst systems are soluble in the polymerization medium it is generally observed that the resulting polymer has low bulk density.

Attempts to use metallocene/organoaluminoxane catalyst systems in a slurry or particle form type polymerization have not heretofore been found to be commercially feasible. It has been observed that when such particle form polymerizations are carried out in the presence of a soluble metallocene/organoaluminoxane catalyst system, large amounts of polymeric material are formed on the surfaces of the polymerization vessel. This fouling produces an adverse effect on the heat transfer and also results in the need for periodic, if not continuous, cleaning of the reactor. It is therefore necessary to have a catalyst system which will not cause significant amounts of reactor fouling.

It is known that a solid form of organoaluminoxane can be obtained by treating a commercial organoaluminoxane solution with a countersolvent; however, such solids have been found to cause reactor fouling in slurry polymerizations. Reactor fouling is still a problem in slurry polymerization even when a countersolvent is used to precipitate the organoaluminoxane onto an insoluble particulate carrier.

It would therefore be desirable to produce an economical solid organoaluminoxy product useful as a cocatalyst in a polymerization process free of reactor fouling.

SUMMARY OF THE INVENTION

An object of the present invention is to provide a solid organoaluminoxy product useful as a cocatalyst which does not produce significant reactor fouling in a particle form polymerization process.

Another object of the present invention is to provide an efficient and economical process for preparing a solid organoaluminoxy product.

Still another object of the present invention is to provide a polymerization catalyst system comprising a transition metal-containing catalyst and a solid organoaluminoxy product for use in a particle form polymerization process.

Still another object of the present invention is to provide a polymerization process free of significant reactor fouling, especially in a particle form polymerization.

In accordance with the present invention, a process for preparing a solid organoaluminoxy product is provided comprising contacting an organoaluminoxane and an oxygen-containing compound selected form the group consisting of organic peroxides, alkylene oxides, and organic carbonates. Other aspects of the present invention include the solid organoaluminoxy product thus produced, a catalyst system comprising a transition metal-containing catalyst and the solid organoaluminoxy product, and a polymerization process employing such catalyst system.

DETAILED DESCRIPTION OF THE INVENTION

Various techniques are known for making organoaluminoxanes. One technique involves the controlled addition of water to a trialkylaluminum. Another technique involves combining a trialkylaluminum and a hydrocarbon with a compound containing water of adsorption or a salt containing water of crystallization. The present invention is considered applicable to any of the commercially available organoaluminoxanes.

Typically the organoaluminoxanes comprise oligomeric, linear and/or cyclic hydrocarbyl aluminoxanes having repeating units of the formula

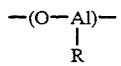

Typically the linear aluminoxanes are represented by the formula:

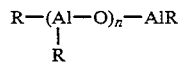

The oligomeric, cyclic aluminoxanes can be represented by the formula:

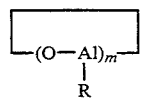

wherein each R is a hydrocarbyl radical, preferably an alkyl radical containing 1–8 carbon atoms, n is 2 to 50, preferably 4 to 40, m is 3 to 50, preferably 4 to 40. Generally the aluminoxanes are more active when m and n are greater than 4, more preferably 10 to 40. Typically R is predominantly methyl or ethyl. Preferably at least about 30 mole percent of the repeating groups have an R which is methyl, more preferably at least 50 mole percent, and still more preferably at least 70 mole percent. Generally in the preparation of an organoaluminoxane, a mixture of linear and cyclic compounds is obtained.

Organoaluminoxanes are commercially available in the form of hydrocarbon solutions, generally aromatic hydrocarbon solutions. Typically such organoaluminoxane solutions contain trialkylaluminum compounds as well as the oligomeric organoaluminoxane. The trialkylaluminum compounds generally include those in which the alkyl radicals contain 1 to 8 carbon atoms, preferably 1 to 2 carbon atoms.

Peroxides useful in the invention are represented by the formula $$R_2OOR_3,$$

wherein $R_2$ and $R_3$ are individually selected from hydrogen, hydrocarbyl, and hydrocarbonyl radicals selected from the group consisting of alkyl, cycloalkyl, aryl, alkenyl, and alkynyl radicals containing 1 to 24 carbon atoms, preferably 1 to 18 carbon atoms and more preferably 1 to 12 carbon atoms, with the proviso that at least one of $R_2$ and $R_3$ is a hydrocarbyl or hydrocarbonyl radical. Preferably both $R_2$ and $R_3$ are individually hydrocarbyl radicals.

Examples of suitable peroxides include diethyl peroxide, diacetyl peroxide, tert-butyl hydroperoxide, di-tert-butyl peroxide, 2,5-dimethyl-(2,5-di(tert-butylperoxy) hexane, tert-amyl hydroperoxide, di-tert-amyl peroxide, dibenzoyl peroxide, dicrotonyl peroxide, bis(1-methyl-1-phenylethyl) peroxide, dilauryl peroxide, peroxybenzoic acid, peroxyacetic acid, tert-butyl perbenzoate, tert-amyl perbenzoate, peroxybutyric acid, peroxycinnamic acid, tert-butyl peracetate, and the like and mixtures thereof. Excellent results have been obtained with di-tert-butyl peroxide and it is preferred.

Suitable alkylene oxides are represented by the formulas

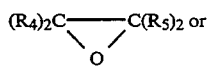

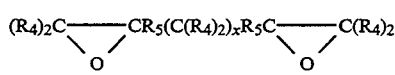

wherein $R_4$ and $R_5$ are individually selected from the group consisting of hydrogen and alkyl radicals containing 1 to 12 carbon atoms, x is 0 to 12, preferably 0 to 8. Examples of suitable alkyl radicals include methyl, ethyl, propyl, isobutyl, isoamyl, octyl and decyl.

Examples of alkylene oxides which are useful include ethylene oxide, propylene oxide, 2,2-dimethyloxirane, 1,2-dimethyloxirane, 1,2-diethyloxirane, cyclohexene oxide, 1-methylcyclohexene oxide, and mixtures thereof.

Other suitable alkylene oxides include glycidyl ethers having the formula $R'(G)_y$ wherein $R'$ is a hydrocarbyl radical having 2 to 12 carbon atoms, y is 1 or 2, and G is the glycidyl group,

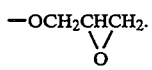

Examples of suitable glycidyl ethers include glycidyl isopropyl n-butyl ether, glycidyl tert-butyl ether, 2,2-dimethyl-1,3-propanediol diglycidyl ether, and 1,4-butanediol diglycidyl ether. Alkylene oxides containing a total of 2 to 16 carbon atoms are preferred, more preferably 2 to 12 carbon atoms. Propylene oxide is especially preferred.

Organic carbonates useful in carrying out the invention are represented by the formulas

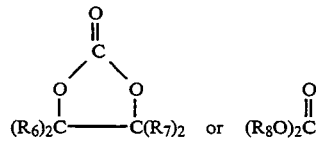

wherein $R_6$ and $R_7$ are individually selected from the group consisting of hydrogen and alkyl radicals containing 1 to 10 carbon atoms and $R_8$ is a hydrocarbyl radical selected from the group consisting of alkyl, cycloalkyl, aryl, aralkyl, and alkaryl radicals having 1 to 12 carbon atoms. The alkyl radical can be straight chain or branched. Examples of suitable alkyl radicals include methyl, ethyl, propyl, isobutyl, isoamyl, octyl and decyl. Examples of suitable organic carbonates include 1,3-dioxolan-2-one (commonly named ethylene carbonate), 4-methyl-1,3-dioxolan-2-one (commonly named propylene carbonate), 4,5-dimethyl-1,3-dioxolan-2-one, 4-(1-butyl)-1,3-dioxolan-2-one, 4,5-di(1-propyl)-1,3-dioxolan-2-one dimethyl carbonate, diethyl carbonate, bis(2-methylallyl) carbonate, dibenzyl carbonate, and diphenyl carbonate, and mixtures thereof. Preferred organic carbonates are those wherein the carbonyldioxy radical is attached to a terminal carbon atom and the carbon adjacent thereto. Propylene carbonate is especially preferred.

The amount of oxygen-containing compound employed relative to the organoaluminoxane is the amount sufficient to produce a solid organoaluminoxy product from an aromatic hydrocarbon solution and can vary over a wide range depending upon the particular compounds employed and the results desired. The molarity of an organoaluminoxane solution can be approximated by vacuum stripping the solvent from a known volume of aluminoxane solution, weighing the recovered solid, and multiplying the weight of the solid in grams per milliliter by 1000 and dividing by the average molecular weight of the aluminoxy units, (i.e. 58 for methylaluminoxane). It is presumed that the vacuum stripping removes a substantial portion of any free trialkylaluminum compound.

Generally the amount of organoaluminoxane is in the range of from about one mole to about 1000 moles per mole of oxygen-containing compound, preferably about 2 moles to about 500 moles, and more preferably from 5 moles to 200 moles per mole of oxygen-containing compound. When employing propylene carbonate as the oxygen-containing compound, a particularly preferred range is from about 20 moles to about 200 moles of organoaluminoxane per mole of propylene carbonate.

The conditions for contacting the oxygen-containing compound and the organoaluminoxane are those sufficient to produce a solid product and can vary widely depending upon the particular compounds employed. Generally the temperature will be in the range of from about 0° C. to about 100° C., preferably from about 10° C. to about 100° C., and more preferably from 10° C. to 75° C. Generally the pressure will be in the range of from about 0 psig to about 100 psig, preferable about 0 psig to about 50 psig. The time of reaction will generally be in the range of from about 1 minute to about 72 hours, preferably about 5 minutes to about 30 hours.

The reaction of the oxygen-containing compound and the organoaluminoxane can be carried out in any suitable manner. Typically the reactants will be contacted in a suitable liquid diluent. A preferred technique involves contacting a hydrocarbon solution of the aluminoxane with a countersolvent to produce a slurry comprising soluble aluminoxane and insoluble aluminoxane and then contacting the resulting slurry with a solution of the oxygen-containing compound. One example is to mix a toluene solution of methylaluminoxane with hexane to form a slurry and then contacting the oxygen-containing compound and the slurry.

It is also within the scope of the present invention to carry out the reaction of the oxygen-containing compound and the aluminoxane in the presence of a particulate diluent so that the insoluble product becomes deposited upon the particulate diluent. Typical particulate diluents include such inorganic materials as silica, alumina, aluminum phosphate, silica-alumina, titania, kaolin, fumed silica, and the like.

It is also within the scope of the present invention to prepare the inventive solid organoaluminoxy product and then combine it with a solution of a trialkylaluminum compound, i.e. trimethylaluminum or others of the type mentioned above, and then to contact the resulting slurry with additional amount of the oxygen-containing compound. It is believed that this process may provide a method for further increasing the molecular weight of the solid organoaluminoxy product. The process can be repeated several times to obtain the desired level of molecular weight, particle size, bulk density, or other characteristic that is desired for a particular application.

In view of the demonstrated activity of the solid organoaluminoxy products of the present invention, it is considered that such solid products will be suitable as replacements for soluble aluminoxy products in polymerization reactions. Accordingly, the inventive solid organoaluminoxane products should be suitable as catalyst components with any number of the transition metal-containing olefin polymerization catalysts that have in the past been employed with soluble aluminoxanes.

Suitable transition-metal containing catalysts are represented by the formula $ML_x$, wherein M is a Group IVB or VB transition metal, x is the valence of the transition metal, and each L is individually selected from the group consisting of cyclopentadienyl-type radicals containing 5 to 20 carbon atoms, hydrocarbyl radicals containing 1 to 12 carbon atoms, alkoxy radicals containing 1 to 12 carbon atoms, aryloxy radicals containing 6 to 12 carbon atoms, halogen and hydrogen.

Some examples of such transition metal-containing olefin polymerization catalysts are disclosed in U.S. Pat. No. 3,242,099, the disclosure of which is incorporated herein by reference. Examples of such transition metal-containing catalysts include titanium trichloride, titanium tetrachloride, titanium tetrabromide, titanium tetraethoxide, titanium tetrabutoxide, titanium tetraiodide, vanadium trichloride, vanadium tetrachloride, zirconium trichloride, zirconium tetrachloride, zirconium tetraethoxide, zirconium tetrabutoxide, and the like and mixtures thereof.

In a particular preferred embodiment the transition metal-containing catalyst component is a metallocene. Suitable metallocene compounds that can be employed include any metallocene compounds known in the art. Examples of suitable metallocene compounds, their preparation, and their use in polymerization processes are described in detail in U.S. Pat. No. 5,091,352; 5,057,475; 5,124,418; and EP 524,624 published Jan. 27, 1993, the disclosures of which are herein incorporated by reference.

Metallocene compounds, as used herein, are represented by the formula above, $ML_x$, wherein at least one L is a cyclopentadienyl-type radical. Cyclopentadienyl-type radicals, as used herein, include unsubstituted cyclopentadienyl, substituted cyclopentadienyl, unsubstituted indenyl, substituted indenyl, unsubstituted fluorenyl, and substituted fluorenyl. The substituents can be, for example hydrocarbyl radicals containing 1 to 12 carbon atoms, alkoxy radicals containing 1 to 12 carbon atoms, or halogen. Typical hydrocarbyl radicals include methyl, ethyl, propyl, butyl, amyl, isoamyl, hexyl, isobutyl, heptyl, octyl, nonyl, decyl, cetyl, 2-ethylhexyl, and phenyl, preferably the hydrocarbyl radicals are alkyl radicals containing 1 to 10 carbon atoms, and more preferably 1 to 6 carbon atoms. The metallocene can contain one, two, three or four cyclopentadienyl-type radicals, preferably two. The metal is selected from Group IVB or VB transition metals, preferably titanium, zirconium, hafnium, and vanadium, and more preferably zirconium.

It is also within the scope of the present invention to have two of the L radicals be cyclopentadienyl-type radicals which are bonded together by a suitable bridging radical such as carbon, silicon, germanium, and tin. Some examples of such bridged ligands include (9-fluorenyl)(cyclopentadienyl) methane, (9-fluorenyl)(cyclopentadienyl) dimethyl methane, 1,2-bisindenyl ethane, and the like.

Metallocenes also include those containing two cyclopentadienyl-type radicals where only one of such radicals is bonded to the transition metal. An example would be (9-fluorenyl)(cyclopentadienyl) methane zirconium trichloride.

Examples of suitable metallocene compounds include bis(cyclopentadienyl) zirconium dichloride, bis(cyclopentadienyl) zirconium dibromide, bis(cyclopentadienyl) zirconium diiodide, bis(methylcyclopentadienyl) zirconium dichloride, bis(n-butylcyclopentadienyl) zirconium dichloride, bis(cyclopentadienyl) hafnium dichloride, bis(cyclopentadienyl) hafnium dibromide, bis(cyclopentadienyl) hafnium diiodide, bis(methylcyclopentadienyl) hafnium dichloride, bis(n-butylcyclopentadienyl) hafnium dichloride, bis(cyclopentadienyl) titanium dichloride, bis(methylcyclopentadienyl) titanium dichloride, bis(n-butylcyclopentadienyl) titanium dichloride, bis(cyclopentadienyl) zirconium methyl chloride, bis(methylcyclopentadienyl) zirconium ethyl chloride, bis(n-butylcyclopentadienyl) zirconium phenyl chloride, bis(cyclopentadienyl) hafnium methyl chloride, bis(methylcyclopentadienyl) hafnium ethyl chloride, bis(n-butylcyelopentadienyl) hafnium phenyl chloride, bis(cyclopentadienyl) titanium methyl chloride, bis(methylcyclopentadienyl) titanium ethyl chloride, bis(n-butylcyclopentadienyl) titanium phenyl chloride, bis(cyclopentadienyl) zirconium dimethyl, bis(methylcyclopentadienyl) zirconium dimethyl, bis(n-butylcyclopentadienyl) zirconium dimethyl, bis(cyclopentadienyl) hafnium dimethyl, bis(methylcyclopentadienyl) hafnium dimethyl, bis(n-butylcyclopentadienyl) hafnium dimethyl, bis(cyclopentadienyl) titanium dimethyl, bis(methylcyclopentadienyl) titanium dimethyl, bis(n-butylcyclopentadienyl) titanium dimethyl, pentamethylcyclopentadienyl titanium trichloride, pentaethylcyclopentadienyl zirconium trichloride, pentaethylcyclopentadienyl hafnium trichloride, bis(pentamethylcyclopentadienyl) titanium diphenyl, (9-fluorenyl)(cyclopentadienyl) methane zirconium dichloride, (9-fluorenyl)(cyclopentadienyl) dimethyl methane zirconium dichloride, bis(indenyl) hafnium dichloride, bis(indenyl) titanium diphenyl, bis(indenyl) zirconium dichloride, (9-fluorenyl)(cyclopentadienyl) methane zirconium trichloride, and the like.

The amount of solid organoaluminoxy product relative to the transition metal-containing catalyst can vary broadly depending upon the particular catalyst selected and the results desired. Typically, the solid organoaluminoxy product will be present in the amount of about 1 mole to about 5000 moles per mole of transition metal-containing catalyst, preferably about 10 moles to about 1000 moles, and more preferably 100 moles to 1000 moles.

A variety of olefin compounds are suitable for use a monomers in the polymerization process of the present invention. Olefins which can be employed include aliphatic mono-1-olefins. While the invention would appear to be suitable for use with any aliphatic mono-1-olefin, those olefins having 2 to 18 carbon atoms are most often used. Ethylene is especially preferred. Often a second mono-1-olefin (comonomer) having from 2 to 12 carbon atoms, preferably from 4 to 10 carbon atoms can be employed. Preferred comonomers include 1-butene, 1-pentene, 4-methyl-1-pentene, 1-hexene, and 1-heptene. Of these 1-hexene is most preferred.

The reaction conditions for contacting the olefin and the catalyst system can vary broadly depending on the olefin employed, and are those sufficient to polymerize the mono-1-olefins. Generally the temperature is in the range of about 20° C. to about 200° C., preferably in the range of 50° C. to 150° C. The pressure is generally in the range of from about 0.5 MPa to about 5.0 MPa (70-725 psi).

The polymerization processes according to the present invention can be performed either batchwise or continuously. The olefin, transition metal-containing catalyst, and solid organoaluminoxy product can be contacted in any order. In a batch process, for example, a stirred autoclave is prepared by first purging with nitrogen and then with a suitable compound, such as isobutane for example. Either the transition metal-containing catalyst or the solid organoaluminoxy product cocatalyst can be charged to the reactor first or the catalyst and the cocatalyst can be charged simultaneously. It is preferred that the transition metal-containing catalyst and the solid organoaluminoxy product are contacted prior to contacting with the olefin. After closing the entry port, a diluent such as isobutane is added to the reactor. The reactor is heated to the desired reaction temperature and olefin, such as ethylene, is then admitted and maintained at a partial pressure within a range of from about 0.5 MPa to about 5.0 MPa (70-725 psi) for best results. At the end of the designated reaction period, the polymerization reaction is terminated and the unreacted olefin and diluent can be vented. The reactor can be opened and the polymer can be collected as a free-flowing white solid and dried to obtain the product.

The present invention is particularly useful in a slurry type polymerization. A particularly preferred type slurry polymerization involves a continuous loop reactor which is continuously charged with suitable quantities of diluent, catalyst, cocatalyst, and polymerizable compounds in any desirable order. Typically the polymerization will include a higher alpha-olefin comonomer and optionally hydrogen. Generally the slurry polymerization would be conducted at a temperature in the range of about 60° C. to about 100° C., although higher and lower temperatures can be used. The employment of hydrogen in such a continuous loop polymerization using the inventive cocatalyst can in some cases provide broad molecular weight distribution. Polyethylenes of varying molecular weight distribution can be produced by varying the amount of hydrogen. The reaction product can be continuously withdrawn and the polymer recovered as appropriate, generally by flashing the diluent and unreacted monomers and drying the resulting polymer.

It is also within the scope of this invention to apply prepolymer to catalyst and cocatalyst to control particle form.

The following examples will serve to show the present invention in detail by way of illustration and not by way of limitation.

EXAMPLE 1

Example 1 demonstrates the effectiveness of various oxygen-containing compounds for preparing solid methylaluminoxane (MAO).

MAO was obtained from Ethyl Corporation as 10 weight percent MAO in toluene solution. The MAO was precipitated by adding a solution containing a predetermined amount of various oxygen-containing compounds dropwise to a slurry of MAO in about 50 to 75 mL hexane. The resulting slurry was stirred at a predetermined temperature for about 2 to 18 hours. The slurry was then filtered. The thus produced MAO solid product was then dried in a dry box. The results are tabulated in Table 1. In the table below, MAO is the amount MAO in millimoles. Oxygen-Containing Compound is the amount of oxygen-containing compound in millimoles. T is temperature in °C. Yield is grams of the solid MAO product produced.

TABLE 1

| Run | MAO (mmol) | Oxygen-Containing Compound (mmol) | T (°C.) | Yield (g) |
|---|---|---|---|---|
| 101 | 17 | None | 25 | 0.17 |
| 102 | 17 | None | 66 | 0.24 |
| 103 | 34 | None | 25 | 0.56 |
| 104 | 17 | 2.2 di-t-butyl peroxide | 25 | 0.21 |
| 105 | 17 | 2.2 di-t-butyl peroxide | 66 | 0.71 |
| 106 | 17 | 2.1 propylene oxide | 25 | 0.70 |
| 107 | 17 | 1.7 propylene carbonate | 25 | 1.06 |
| 108 | 34 | 2.1 propylene carbonate | 25 | 1.88 |
| 109 | 34 | 1.4 propylene carbonate | 25 | 1.40 |
| 110 | 34 | 1.0 propylene carbonate | 25 | 0.95 |

Table 1 demonstrates the effectiveness of organic peroxides, alkylene oxides, and organic carbonates in precipitating MAO.

EXAMPLE 2

Example 2 demonstrates the effectiveness of the inventive catalyst system in polymerizing ethylene. The catalyst system was prepared employing solid organoaluminoxy product (MAO) from Example 1 and a metallocene, bis(n-butylcyclopentadienyl) zirconium dichloride, available from Ethyl Corporation.

A predetermined amount of solid MAO product was slurried in 20-30 mL hexane. A solution containing the amount of metallocene indicated in Table 2 was added and the mixture was stirred at room temperature for 1 to 28 hours. The thus produced solid MAO product/metallocene catalyst system was collected on a filter and dried to constant weight in a dry box.

Polymerizations were conducted in a 1-gallon stirred autoclave reactor under particle form conditions. The polymerizations were conducted at about 70° C. in 2 liters isobutane in the presence of hydrogen for about one hour, except Run 207 where the polymerization run was 23 minutes. The total pressure was about 340 psig and the partial pressure of the isobutane and hydrogen was about 152 psig. After the polymerization was complete, the isobutane was removed and the polymer collected as a dry fluff. The results are tabulated in Table 2.

In the table below, OC/Run is the oxygen-containing compound and the Run number from Example 1 of the solid MAO product employed in the catalyst system. MAO/OC is the ratio of moles of MAO per mole of oxygen-containing compound employed in preparing the solid organoaluminoxy product. DTBP is di-tert-butyl peroxide. PO is propylene oxide. PC is propylene carbonate. MAO is the millimoles of solid MAO product combined with the metallocene to form the catalyst system. Metallocene is the millimoles of bis(n-butylcyclopentadienyl) zirconium dichloride combined with the solid MAO product to form the catalyst system. Catalyst is the grams of solid MAO/Metallocene catalyst system employed in the polymerization. Yield is the grams of polyethylene produced.

TABLE 2

| Run | OC/Run | MAO/OC | MAO (mmols) | Metallocene (mmols) | Catalyst (g) | Yield (g PE) |
|---|---|---|---|---|---|---|
| 201 | DTBP/105 | 8 | 4.3 | 0.0086 | 0.0414 | 95 |
| 202 | PO/106 | 8 | 4.3 | 0.0074 | 0.0446 | 19 |
| 203 | PO/106 | 8 | 4.3 | 0.0074 | 0.0972 | 100 |
| 204 | PC/107 | 10 | 3.4 | 0.0035 | 0.0979 | 4 |
| 205 | PC/108 | 16 | 3.4 | 0.0140 | 0.0802 | * |
| 206 | PC/109 | 24 | 3.4 | 0.0070 | 0.0854 | 307 |
| 207 | PC/110 | 34 | 3.4 | 0.0140 | 0.0923 | 351** |

*Light dusting of polymer inside reactor
**Polymerization time was 23 minutes

Table 2 demonstrates the effectiveness of employing a catalyst comprising a metallocene and a solid MAO product reacted with various oxygen-containing compounds. It is noted that solid MAO product prepared at an MAO/OC ratio of greater than 20, produces an especially active catalyst.

That which is claimed is:

1. A process for preparing a solid organoaluminoxy product useful as a polymerization cocatalyst, said process comprising contacting an organoaluminoxane and an oxygen-containing compound selected from the group consisting of organic peroxides, alkylene oxides, and organic carbonates;
   wherein said organoaluminoxane is represented by the formulas:

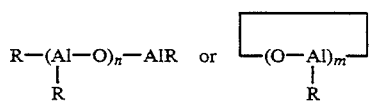

wherein each R is a hydrocarbyl radical containing 1 to 8 carbon atoms, n is 2 to 50, and m is 3 to 50;
   wherein said organic peroxide is represented by the formula $R_2OOR_3$ wherein $R_2$ and $R_3$ are individually selected from hydrogen, hydrocarbyl, and hydrocarbonyl radicals selected from the group consisting of alkyl, cycloalkyl, aryl, alkenyl, and alkynyl radicals containing 1 to 24 carbon atoms with the proviso that at least one of $R_2$ or $R_3$ is a hydrocarbyl or hydrocarbonyl radical;
   wherein said alkylene oxide is represented by the formulas

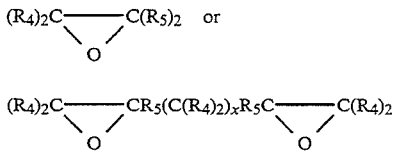

wherein $R_4$ and $R_5$ are individually selected from the group consisting of hydrogen and alkyl radicals containing 1 to 12 carbon atoms;
   wherein said organic carbonate is represented by the formulas

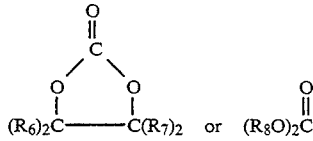

wherein $R_6$ and $R_7$ are independently selected from the group consisting of hydrogen and an alkyl radical containing 1 to 10 carbon atoms, $R_8$ is a hydrocarbyl radical selected from the group consisting of alkyl, cycloalkyl, aryl, aralkyl, and alkaryl radicals having 1 to 12 carbon atoms;
   wherein said organoaluminoxane is present in an amount in the range of from about one mole to about 1000 moles per mole of oxygen-containing compound.

2. A process according to claim 1 wherein said organoaluminoxane is present in an amount in the range of from about 2 moles to about 500 moles per mole of oxygen-containing compound.

3. A process according to claim 2 wherein said organoaluminoxane is present in an amount in the range of from 5 moles to about 200 moles per mole of organoaluminoxane.

4. A process according to claim 1 wherein said said at least one hydrocarbyl or hydrocarbonyl radical in said peroxide contains from 1 to 18 carbon atoms.

5. A process according to claim 4 wherein said at least one hydrocarbyl or hydrocarbonyl radical in said peroxide contains from 1 to 12 carbon atoms.

6. A process according to claim 1 wherein both R radicals in said peroxide are hydrocarbyl or hydrocarbonyl radicals.

7. A process according to claim 6 wherein said peroxide is di-tert-butyl peroxide.

8. A process according to claim 1 wherein said alkylene oxide contains a total of 2 to 16 carbon atoms.

9. A process according to claim 8 wherein said alkylene oxide contains a total of 2 to 12 carbon atoms.

10. A process according to claim 9 wherein said alkylene oxide is propylene oxide.

11. A process according to claim 1 wherein said organic carbonate contains a total of 3 to 16 carbon atoms.

12. A process according to claim 11 wherein said organic carbonate contains a total of 3 to 12 carbon atoms.

13. A process according to claim 12 wherein said organic carbonate is propylene carbonate.

14. A process according to claim 13 wherein said organoaluminoxane is present in the range of from about 20 moles to about 200 moles per mole of propylene carbonate.

15. A process according to claim 1 wherein said contacting is conducted a temperature in the range of from about 0° C. to about 100° C.

16. A process according to claim 15 wherein said contacting is conducted at a temperature in the range of about 10° C. to about 100° C.

17. A process according to claim 16 wherein said contacting is conducted at a temperature in the range of from 10° C. to 75° C.

18. A solid organoaluminoxy product prepared according to the process of claim 1.

19. A solid organoaluminoxy product useful as a polymerization cocatalyst, said product comprising the reaction product of an organoaluminoxane and an oxygen-containing compound selected from the group consisting of an organic peroxide, an alkylene oxide, and an organic carbonate;

wherein said organoaluminoxane is represented by the formulas:

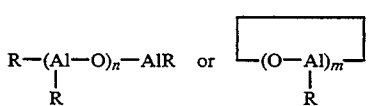

wherein each R is an alkyl radical containing 1-8 carbon atoms, n is 4 to 40, and m is 4 to 40;

wherein said organic peroxide is represented by the formula $R_2OOR_3$, wherein $R_2$ and $R_3$ are individually selected from hydrogen, hydrocarbyl, and hydrocarbonyl radicals selected from the group consisting of alkyl, cycloalkyl, aryl, alkenyl, and alkynyl radicals containing 1 to 18 carbon atoms with the proviso that at least one of $R_2$ or $R_3$ is a hydrocarbyl or hydrocarbonyl radical;

wherein said alkylene oxide is represented by the formula

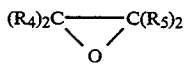

wherein $R_4$ and $R_5$ are individually selected from the group consisting of hydrogen and alkyl radicals containing 1 to 12 carbon atoms;

wherein said organic carbonate is represented by the formula

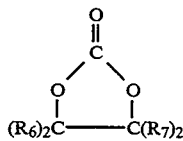

wherein $R_6$ and $R_7$ are individually selected from the group consisting of hydrogen and an alkyl radical containing 1 to 10 carbon atoms.

20. A solid organoaluminoxy product according to claim 19 wherein said R is at least about 30 mole percent methyl radicals.

21. A solid organoaluminoxy product according to claim 20 wherein said R is at least 50 mole percent methyl radicals.

22. A solid organoaluminoxy product according to claim 21 wherein said R is at least 70 mole percent methyl radicals.

23. An olefin polymerization catalyst system comprising the solid organoaluminoxy product of claim 18 and at least one transition metal-containing olefin polymerization catalyst represented by the formula $ML_x$, wherein M is a Group IVB or VB transition metal, x is the valence of the transition metal, and each L is individually selected from the group consisting of cyclopentadienyl-type radicals containing 5 to 20 carbon atoms, hydrocarbyl radicals containing 1 to 12 carbon atoms, alkoxy radicals containing 1 to 12 carbon atoms, aryloxy radicals containing 6 to 12 carbon atoms, halogen and hydrogen.

24. A catalyst system according to claim 23 wherein at least one transition metal-containing catalyst is a metallocene at least one L is a cyclopentadienyl-type radical.

25. A catalyst system according to claim 24 wherein said metallocene is selected from the group consisting of bis(cyclopentadienyl) zirconium dichloride and bis(n-butyl cyclopentadienyl) zirconium dichloride.

26. A solid organoaluminoxy product useful as a polymerization cocatalyst, said product consisting essentially of the reaction product of an organoaluminoxane and an oxygen-containing compound selected from the group consisting of organic peroxides, alkylene oxides, and organic carbonates;

wherein said organoaluminoxane is represented by the formulas:

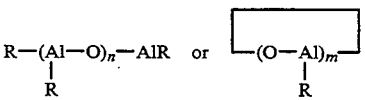

wherein each R is an alkyl radical containing 1-8 carbon atoms, n is 4 to 40, and m is 4 to 40;

wherein said organic peroxide is represented by the formula $R_2OOR_3$ wherein $R_2$ and $R_3$ are individually selected from hydrogen, hydrocarbyl, and hydrocarbonyl radicals selected from the group consisting of alkyl, cycloalkyl, aryl, alkenyl, and alkynyl radicals containing 1 to 18 carbon atoms with the proviso that at least one of $R_2$ or $R_3$ is a hydrocarbyl radical;

wherein said alkylene oxide is represented by the formula

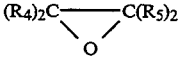

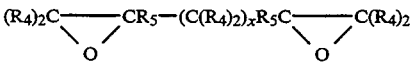

wherein $R_4$ and $R_5$ are individually selected from the group consisting of hydrogen and alkyl radicals containing 1 to 12 carbon atoms;

wherein said organic carbonate is represented by the formula

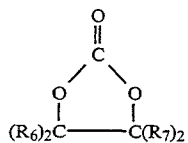

wherein $R_6$ and $R_7$ are individually selected from the group consisting of hydrogen and alkyl radicals containing 1 to 10 carbon atoms.

27. A solid organoaluminoxy product useful as a polymerization cocatalyst, said product comprising the reaction product of methylaluminoxane and an oxygen-containing compound selected from the group consisting of di-tert-butyl peroxide, propylene oxide, and propylene carbonate.

* * * * *